July 26, 1955  E. J. HERBERT  2,713,807
FISHING FLY SELECTOR
Filed Nov. 26, 1951
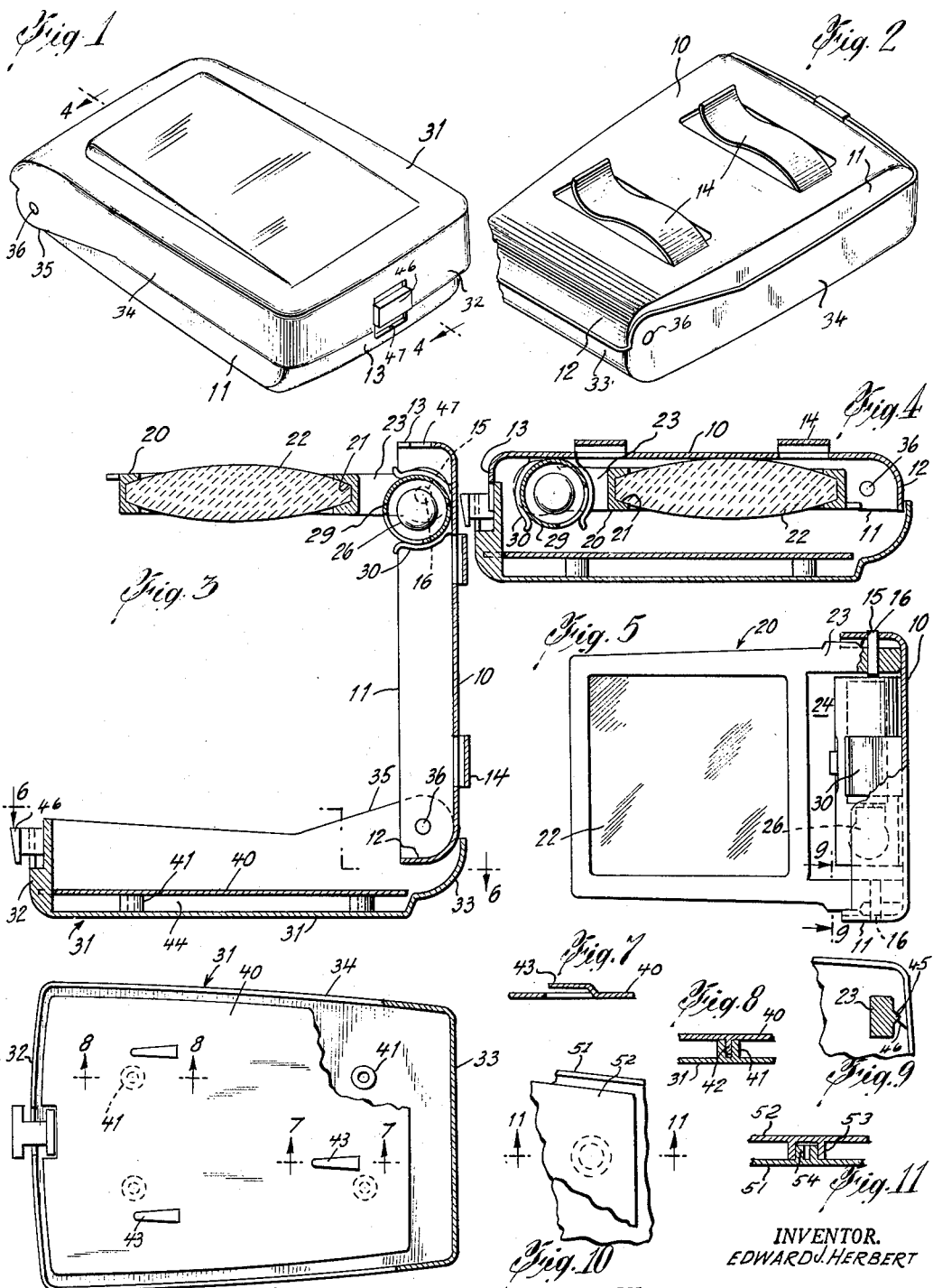
INVENTOR.
EDWARD J. HERBERT
BY John P. Chandler
his ATTORNEY

United States Patent Office 2,713,807
Patented July 26, 1955

2,713,807

FISHING FLY SELECTOR

Edward J. Herbert, Scarsdale, N. Y.

Application November 26, 1951, Serial No. 258,115

1 Claim. (Cl. 88—39)

This invention relates to a fishing fly selector and carrier and has for its primary object the provision of a novel fly fishermen's accessory including magnifying and lighting means to enable a sports fisherman to select a desired fly from an assortment supported in a receptacle and to attach the same to a leader on the fishing line with ease, notwithstanding poor lighting conditions often found in trout fishing streams.

Another object of the invention is to provide a combined unit arranged for attachment to the shirt or other upper garment worn by the fisherman and including a flanged vertical wall supporting an illuminated magnifying lens at its upper end carrying a hinged fly receptacle at its lower end provided with means for mounting a number of assorted flies which can readily be detached from their support and be secured to the fishing line.

Yet another object of the invention is to provide a fly selector and receptacle where the latter includes a magnetized plate to which the flies adhere but from the surface of which the flies are readily removable.

A further object of the invention is to provide a fly support of the character described which when in closed position forms a novel housing for the flies and which retains the latter in orderly relation during normal transportation.

In the drawing:

Fig. 1 is a perspective view of an embodiment of the present invention in closed position;

Fig. 2 is a broken plan view of the opposite side thereof;

Fig. 3 is a central vertical section showing the article in open position;

Fig. 4 is a section taken on line 4—4 of Fig. 1;

Fig. 5 is a top plan view, partially in section, of the magnifying glass and frame therefor, and the support for the latter;

Fig. 6 is a section taken on line 6—6 of Fig. 3;

Fig. 7 is a section taken on line 7—7 of Fig. 6;

Fig. 8 is a section taken on line 8—8 of Fig. 6;

Fig. 9 is a broken section taken on line 9—9 of Fig. 5;

Fig. 10 is a broken section showing a modified form of receptacle;

Fig. 11 is a section taken on line 11—11 of Fig. 10.

The device of the present invention includes a vertical wall 10 shown in Fig. 3 and having a continuous flange including side flanges 11, a curved lower flange 12 and an upper flange 13. This may be molded from plastic material or stamped from sheet metal and it includes clips 14 which may be formed integrally with the wall and which are arranged for attachment to the wearer's shirt or suspenders. In the case of sheet metal construction these clips may be simply struck out from the wall without removing any metal and the same construction may be used in molded plastic.

At the upper end of the side walls, aligned openings 15 are provided which receive bearing pins 16 which carry a generally rectangular frame 20 having inwardly facing channels 21 which receive and support a magnifying glass 22. The frame is formed with spaced arms 23 which receive the bearing pins. A housing 24 enclosing a flash light battery is mounted between such extensions. The lighting means include a bulb 26 operatively connected with the battery and a combined reflector and apertured shade 29 is rotatable to an adjusted, fixed position to focus the beam in a desired direction. The lighting structure may be mounted by a spring clip 30.

A lower receptacle 31 has a continuous flange including a front wall 32, a curved rear wall 33 and side walls 34 whose rear, upwardly extending terminals 35 receive bearing pins 36 to secure the receptacle in pivoted relation at the lower end of vertical wall 10. The latter flange is of such proportions as to receive the flange of vertical wall 10 when the parts are in closed relation as shown in Figs. 1 and 2.

A fly-supporting plate or insert 40 is supported in the lower receptacle in fixed, spaced relation to the lower walls by means of sockets 41 formed in the latter which receive pins 42 formed in the lower surface of the insert. The upper surface of the insert has a plurality of upwardly struck out fly supporting clips 43. The space shown at 44 between the insert and the lower wall may receive a number of surplus flies.

Fig. 9 shows the means whereby the frame 20 is retained in horizontal position. The arms 23 are provided with protrusions 45 which are received in detents 46 mounted in the vertical member. The two hinged parts are adapted to be retained in closed position by means of a latch 46 which cooperates with a slot 47. In the modified form of the invention shown in Figs. 10 and 11, the lower receptacle 51 is substantially the same as in the first embodiment but in this instance the insert comprises a magnetized plate 52 which is provided on its lower surface with sockets 53 which are received on bases 54. The flies being formed from ferrous metal are received on the magnetized plate and retain their position.

While two forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

I claim:

A selector and threading device for fishing flies comprising a vertical wall provided with means for attachment to a users' garment, a rectangular frame and legs extending from the frame which are pivotally mounted at the upper end of the vertical wall, a magnifying lens mounted in the frame, an illuminating bulb carried at the upper end of the vertical wall, a hinged receptacle at the lower end of said wall and provided with side flanges which receive the vertical wall and its attached members when the article is in closed position, and a fly supporting plate positioned within the receptacle and having a space between the plate and the lower wall of the receptacle.

References Cited in the file of this patent

UNITED STATES PATENTS

| | | |
|---|---|---|
| 1,554,905 | Bignold | Sept. 22, 1925 |
| 1,612,693 | Bausch | Dec. 28, 1926 |
| 2,388,476 | Esdaile | Nov. 6, 1145 |
| 2,541,760 | Harrison | Feb. 13, 1951 |
| 2,615,366 | Rothweiler | Oct. 28, 1952 |